(12) United States Patent
Schertler

(10) Patent No.: US 6,539,091 B1
(45) Date of Patent: Mar. 25, 2003

(54) APPARATUS FOR SIDETONE DAMPING

(75) Inventor: Thomas Schertler, Darmstadt (DE)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 09/058,698

(22) Filed: Apr. 10, 1998

(30) Foreign Application Priority Data

Apr. 10, 1997 (DE) .......................................... 197 14 966

(51) Int. Cl.$^7$ ................................................ H04M 1/00
(52) U.S. Cl. ............... 379/406.08; 379/392; 379/390.01
(58) Field of Search ................................. 379/391, 392, 379/417, 390, 402, 403, 406; 370/288, 290

(56) References Cited

U.S. PATENT DOCUMENTS

| | | | |
|---|---|---|---|
| 5,463,618 A | * 10/1995 | Furukawa et al. | .......... 370/290 |
| 5,646,990 A | * 7/1997 | Li | .......... 379/406.08 |
| 5,668,794 A | * 9/1997 | McMcaslin et al. | .......... 370/288 |
| 6,141,415 A | * 10/2000 | Rao | .......... 379/406.08 |

FOREIGN PATENT DOCUMENTS

| | | |
|---|---|---|
| DE | 42 29 910 A1 | 3/1994 |
| DE | 43 05 256 A1 | 8/1994 |

OTHER PUBLICATIONS

"Practical Applications of Adaptation Control for NLM-S–Algorithms Used for Echo Cancellation with Speech Signals" (Burger), IWAENC, Roros, Norway, Jun. 1995, pp. 87–90.

"A Robust Acoustic Echo Canceller for a Hands–Free Voice– Controlled Telecommunication Terminal" (Burger et al.) Eurospeech 1993, Berlin, pp. 1809–12.

"Adaptive Switching Circuits" (Widrow et al.), IRE Westcon 1960, pp. 96–104.

"Freisprechen mit Verstärkunssteuerung und Echokompensation" (Heitkämper), VDO Progress Reports, vol. 10, No. 380, pp. 1–147, translates into "Hands–Free Talking with Reinforcing Control and Echo Compensation".

"General Characteristics of International Telephone Connections and International Telephone Circuits", ITU–T, G. 167, pp. 1–16.

"Probleme bei der Kompensation akustischer Echos" (Becker et al.), Frequenz 36, 1984, pp. 142–48, translates into "Problems when Compensating Acoustic Echoes".

"Echo Suppressors", UTI–T Recommendation G. 164, pp. 186–221.

"Appendix A –Derivations", pp. 149–72.

* cited by examiner

*Primary Examiner*—Fan Tsang
*Assistant Examiner*—Jefferey Harold
(74) *Attorney, Agent, or Firm*—Laurence A. Greenberg; Werner H. Stemer; Ralph E. Locher

(57) ABSTRACT

An apparatus for sidetone damping can be used in telephones configured for hands-free operation. The apparatus has a reception branch with a speaker and a transmission branch with a microphone. An adaptive echo compensator is provided for compensating for echos interfering with signals in the transmission branch. A damping device for damping the transmission branch or reception branch is also provided. A device for determining the power transfer factor is provided for controlling the adaptation of the adaptive echo compensator and for adjusting the damping of the damping device.

10 Claims, 3 Drawing Sheets

APPARATUS FOR SIDETONE DAMPING

BACKGROUND OF THE INVENTION

Field of the Invention

The invention relates to an apparatus for sidetone (noise) damping which can be used in telephones configured for hands-free operation. Telephones intended for connection to the public telephone system must meet certain specifications. One of these specifications involves sidetone damping, that is, the damping of the echo from a remote conversation partner. In International Telecommunication Standardization Sector (ITU-T) Recommendation G. 164, Acoustic Echo Controller, Helsinki, March 1993, Section 5.4.1., echo damping of 40 to 45 dB is called for in the case of one individual talking (that is, no more than one of the two partners in the conversation is speaking). In a conversation using a handset these damping values are easily met because of the extensive acoustical decoupling between the receiver and the microphone capsule. In a hands-free telephone setup that has no handset such acoustical decoupling is not possible. Special measures must then be taken to achieve the requisite sidetone damping.

In most commercially available telephones configured for hands-free operation, there is a damping device (level scales, adaptive loss control, level cradle), which depending on the conversation status performs the requisite damping in either the transmission branch or the reception branch. Such a telephone can be found in the ARCOFI component PSB 2163 made by Siemens. Difficulties arise in hands-free operation based on level scales especially if the conversation partners try to interrupt one another or talk at the same time. Then the introduced damping has a negative effect and can result in isolated speech portions being "chopped off" or entirely suppressed. For many users, this unsatisfactory performance of the level scales during crosstalk has prevented commercial acceptance of the hands-free telephone configuration.

A completely different principle for achieving the requisite echo damping is provided by digital echo compensators. Digital echo compensators generate estimated values of the sampled values of the acoustical echo in the microphone signal. By subtracting these estimated values from the sampled values of the actual microphone signal, the proportion of the echo in the microphone signal is reduced. The use of digital filters for echo compensation in hands-free telephone systems is described in T. Becker, E. Hänsler and U. Schultheis, Probleme bei der Kompensation Akustischer Echos [Problems in Acoustical Echo Compensation], Frequenz 6 (36) pp. 142–148 (1984). Echo compensators are configured as adaptive filters, with which one seeks to simulate the transmission environment of the room in which the telephone set is located as accurately as possible and to follow along with changes in the transmission environment that are caused by user movements or by air and temperature fluctuations. The adaptation of the filter coefficients is allowed to occur only if a speech signal on the part of the remote subscriber is present. As soon as the local partner also speaks, the echo compensator can diverge. In crosstalk (doubletalk), the adaptation must therefore be stopped or at least sharply slowed down. Due to a lack of system calibration, the echo damping of an echo compensator can be slight at certain times. These and other peripheral conditions (high computer capacity and memory required, space required, and heat development in the circuit) mean that under realistic conditions echo damping of approximately 20 to 25 dB cannot be undershot.

In order to be able to assure the requisite damping, as a rule, an echo compensator is operated only in conjunction with a level scales. The damping stroke of the level scales can then be reduced by the echo damping already performed by the echo compensator, so that the switching behavior of the level scales is no longer perceived as being so irritating.

From the prior art article by P. Heitkämper, Freisprechen mit Verstärkungssteuerung und Echokompensation [Hands-Free Telephone with Gain Control and Echo Compensation], Fortschritt-Berichte, Reihe 10, Nr. 380 [Progress Reports, Series 10, No. 380], VDI [Association of German Engineers], Germany, 1995, a hands-free system and process is described that is based on the combination of gain control and an echo compensator. The system gain control uses a nonlinear characteristic curve that serves to amplify all the input values on the transmission side, whose average short term magnitude is above a certain threshold value, in such a way that their average power assumes an intended desired level (compensation range). Input values whose average power is less than the threshold value are considered to be background noise or echo and are damped as a function of their average power. The average short term magnitude of the input data is ascertained by smoothing the magnitudes of the input data with a nonlinear filter, whose time constants are selected such that they are capable of following rising magnitudes in the input signal faster than falling magnitudes. The threshold value, which determines whether the input data will be treated like a desired speech signal or like an undesired echo or background noise, is adapted adaptively to the background noise prevailing in the room, to the echo level, and to the level of the local conversation partner. For adapting the threshold value, long-term average values for the local and remote background noise and speech levels, a correlation measurement for speech activity detection, and an estimated value for the speaker-microphone coupling factor (power ratio between the received signal and the transmitted signal) are determined.

The echo compensation uses an NLMS algorithm (normalized least mean square algorithm), which is described in B. Widrof and M. E. Hoff, Adaptor switching circuits, IRE Westcon Convention CONV. Rec., Part 4, pp. 96–104, 1960. For the NLMS algorithm, a simple increment width controller sets the adaptation increment width to zero if excitation from the remote conversation partner is inadequate or if crosstalk is detected. In all other cases, the adaptation increment width is set to a constant value between 0 and 1. The filtering is done merely with subsampling of the transmitted frequency band, for the sake of reducing the effort. Adequate excitation is ascertained by using a comparison between the average short term magnitude of the excitation and the long term average magnitude of the remote background noise level. Crosstalk is detected if the average short term magnitude of the transmitted signal rises above the value of the expected echo (which is equivalent to the average short term magnitude of the received signal, multiplied by the speaker-microphone coupling factor, multiplied by the safety factor). The speaker-microphone coupling factor in turn is only estimated if a previously calculated correlation measurement has undershot a certain threshold.

Using the nonlinear characteristic curve in the gain control cannot, in the method described, assure that the aforementioned ITU-T Recommendation G. 164 can be adhered to in all conversation situations using the hands-free method.

Particular methods of the type described in the above publication by P. Heitkämper in VDI Fortschritt-Berichte have also been disclosed in Non-Prosecuted, German Patent Applications DE 42 29 910 A1 and DE 43 05 256 A1.

SUMMARY OF THE INVENTION

It is accordingly an object of the invention to provide an apparatus for sidetone damping, which overcomes the herein-mentioned disadvantages of the heretofore-known devices and methods of this general type, and in which the ITU-T Recommendation is adhered to such that the "chopping off" of individual speech passages is avoided.

With the foregoing and other objects in view there is provided, in accordance with the invention, an apparatus for acoustical sidetone damping, including: a reception branch having a speaker and receiving an input signal; a transmission branch having a microphone for transmitting an output signal; an adaptive echo compensator for compensating for an echo in the transmission branch, the adaptive echo compensator adaptively filters the input signal of the reception branch for producing a filtered signal, and subtracts the filtered signal from the output signal of the transmission branch resulting in a compensated output signal; a damping device for damping at least one of the compensated output signal of the transmission branch and the input signal of the reception branch; a control device connected to the adaptive echo compensator and to the damping device, the control device outputs control signals for adaptation of the adaptive echo compensator and to adjust damping of the damping device, the control device receives an average signal magnitude of the input signal and an average signal magnitude of the compensated output signal; and a correlator for determining and outputting a correlation measurement signal, the correlation measurement signal derived from the input signal of the reception branch and the output signal of the transmission branch, and the control device receives the correlation measurement signal.

In accordance with an added feature of the invention, the control device outputs a corresponding signal if the correlator ascertains crosstalk in the transmission branch or in the reception branch, the echo compensator receives the corresponding signal and the adaptation of the echo compensator is halted if the corresponding signal is received.

In accordance with another feature of the invention, there is an excitation detector which receives the average signal magnitude of the input signal, compares the average signal magnitude to a predetermined average magnitude, and outputs an excitation signal if an adequate average signal magnitude of the input signal is present.

In accordance with an additional feature of the invention, the echo compensator receives the excitation signal and the adaptation of the echo compensator occurs only if the excitation detector outputs the excitation signal.

In accordance with yet another added feature of the invention, there is a first form filter for outputting a first filter signal connected between the reception branch and the adaptive echo compensator, a second form filter for outputting a second filter signal connected downstream of the microphone in the transmission branch, and an inverse form filter connected downstream of the second form filter in the transmission branch.

In accordance with yet another feature of the invention, there is a first estimating device for deriving the average signal magnitude of the input signal, the first estimating device is connected between the first form filter and the control device, the first estimating device receives the first filter signal and estimates an average magnitude of the first filter signal for deriving the average signal magnitude of the input signal, and outputs an average signal magnitude of the input signal to the control device; and a second estimating device connected upstream of the control device for deriving the average signal magnitude of the compensated output signal, the second estimating device receives the second filter signal and estimates an average magnitude of the second filter signal for deriving the average signal magnitude of the compensated output signal, and outputs the average signal magnitude of the compensated output signal to the control device.

In accordance with yet another additional feature of the invention, there is a first crosstalk detector for receiving and processing the excitation signal from the excitation detector and the control signals from the control device, the first crosstalk detector furnishes a corresponding first crosstalk signal to the echo compensator.

In accordance with a further added feature of the invention, there is a second crosstalk detector outputting a corresponding control signal received by and controlling the damping device, the second crosstalk detector receives the average signal magnitude of the input signal, the average signal magnitude of the output signal, the average signal magnitude of the compensated output signal, and a control signal from the control device.

In accordance with a yet further additional feature of the invention, the second crosstalk detector reduces the damping of the damping device if crosstalk is detected in the transmission branch and/or in the reception branch.

In accordance with yet another further feature of the invention, the echo compensator has filter coefficients and the adaptation of the filter coefficients is distributed over a plurality of sampling steps for increasing a number of the filter coefficients of the echo compensator.

In accordance with a concomitant feature of the invention, the adaptation of the echo compensator is effected by means of a normalized least mean square method.

Other features which ate considered as characteristic for the invention are set forth in the appended claims.

Although the invention is illustrated and described herein as embodied in an apparatus for sidetone damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
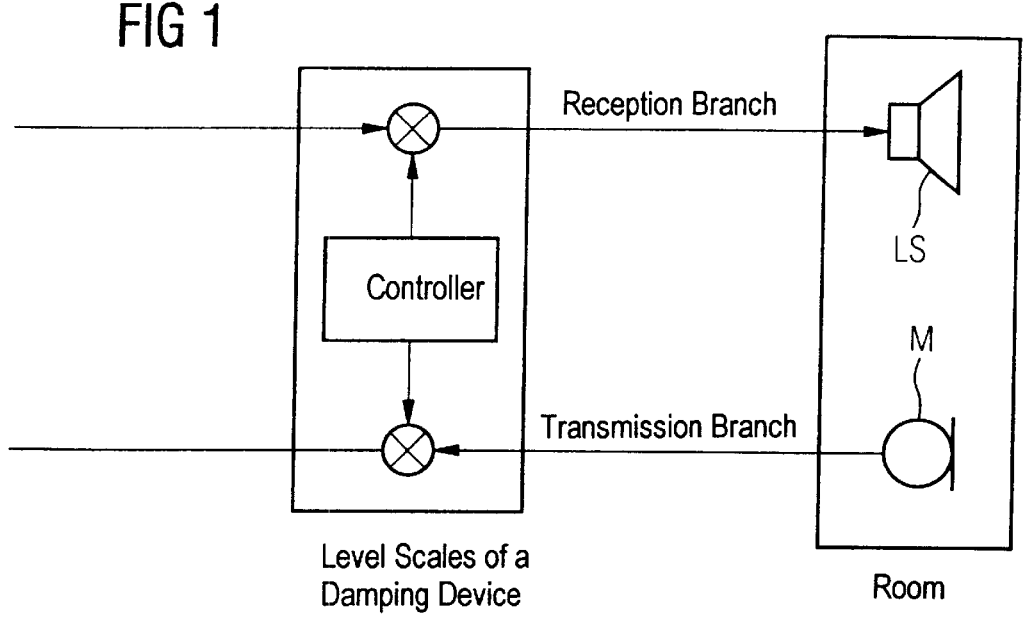
FIG. 1 is a circuit block diagram of a hands-free configuration in accordance with the prior art.

Elements of identical construction and function are provided with the same reference symbol and will in each case be described only once. Referring now to the figures of the drawing in detail and first, particularly, to FIG. 1 thereof, there is shown a prior art hands-free telephone system.

The system is formed of a damping device including a level scales and controller, a microphone M and a speaker LS. Depending on the conversation status, the damping device performs the requisite damping in either a transmission branch or a reception branch.

Figure 2:
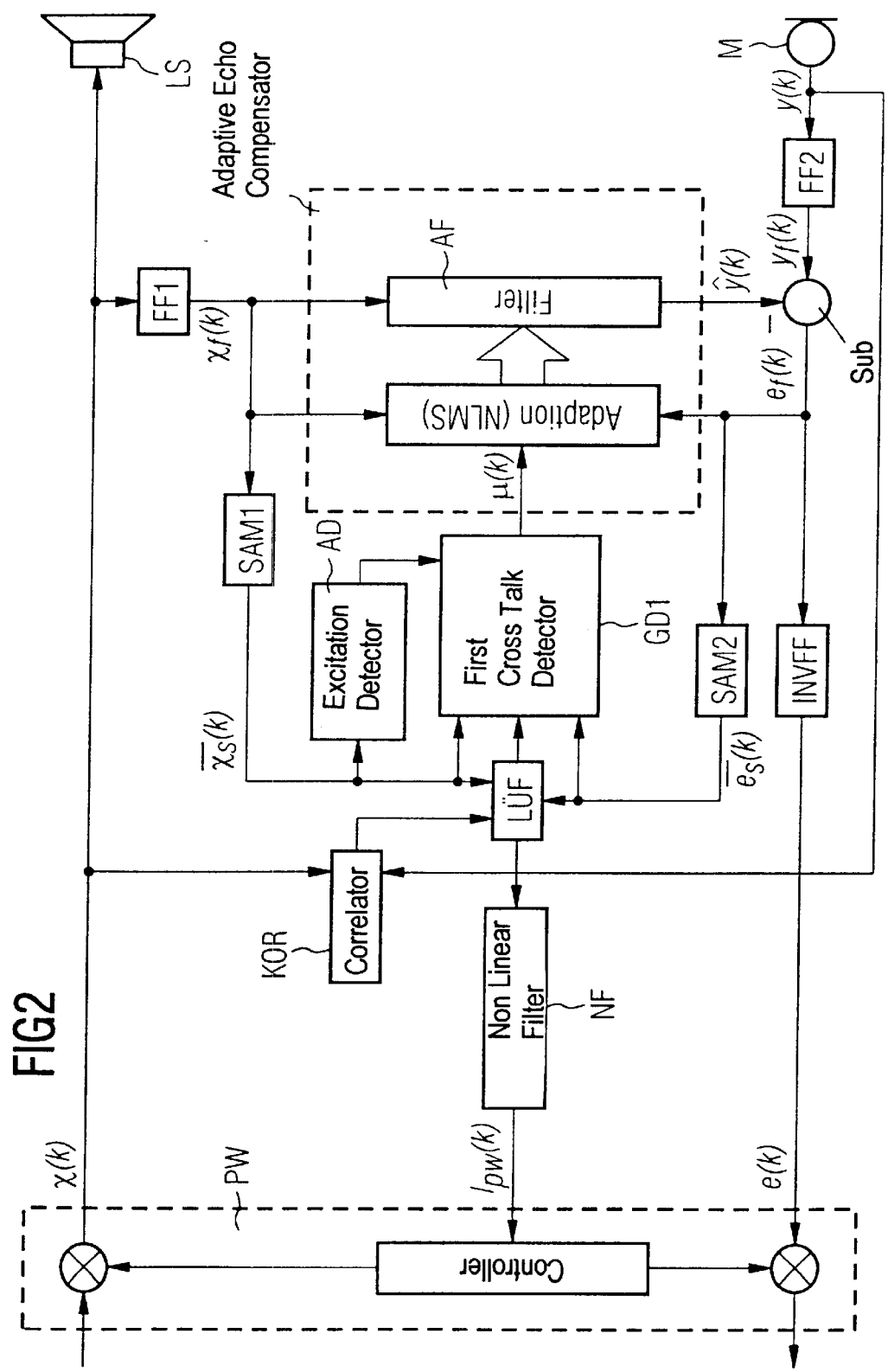
FIG. 2 is a circuit block diagram of a first embodiment of a hands-free configuration for sidetone damping according to the invention.

According to the invention, the hands-free configuration shown in FIG. 2 receives a signal x(k), which is delivered to a speaker LS in the reception branch. The transmission branch is also provided, which has the microphone M. A transmission branch signal e(k) is located at the output of the transmission branch and is transmitted, possibly damped, to a remote telephone set. In the apparatus of the invention, an adaptive filter AF for sidetone damping (noise attenuation) is provided. The adaptive filter AF is connected on the input side to a first form filter FF1 and a first estimating device SAM1 (for "short term average magnitude"). From the received signal x(k), the form filter FF1 generates a filtered received signal $x_f(k)$. From the signal $x_f(k)$, the adaptive filter AF generates an estimated microphone signal $\hat{y}(k)$, which is subtracted from the filtered microphone signal $y_f(k)$ in order to generate the compensated transmitted signal $e_f(k)$. The coefficients of the adaptive filter AF are adjusted by an NLMS algorithm, in conjunction with the corresponding adaptation increment width $\mu(k)$ as previously described. Input variables of the NLMS algorithm are the filtered received signal $x_f(k)$, the adaptation increment width $\mu(k)$, and the filtered compensated transmitted signal $e_f(k)$. From the compensated transmitted signal $e_f(k)$, the transmission branch signal e(k) is obtained by filtration using an inverse form filter INVFF. From the filtered received signal $x_f(k)$, a short term average magnitude $\bar{x}_s(k)$ is formed by the first estimating device SAM1. The short term average magnitude $\bar{x}_s(k)$ is delivered first to an excitation detector AD, second to a first crosstalk detector GD1, and third to a device for determining the power transmission factor LÜF. The first crosstalk detector GD1 also receives as input signals the output signal of the excitation detector AD, the power transmission factor lüf determined by the device for determining the power transmission factor LÜF, and an estimated short term average magnitude $\bar{e}_s(k)$ of the compensated transmitted signal $e_f(k)$. From these variables, the first crosstalk detector GD1 determines the adaptation increment width $\mu(k)$ and makes the adaptation increment width $\mu(k)$ available to an adaptive echo compensator AK having the adaptive filter AF. The device for determining the power transmission factor LÜF has as its input variables the short term average magnitude $\bar{x}_s(k)$ of the received signal x(k), a correlation measurement which originates in a correlator KOR, and the short term average magnitude $\bar{e}_s(k)$ of the compensated transmitted signal $e_f(k)$ The correlator KOR determines the correlation measurement from the received signal x(k) and the microphone signal y(k).

The device for determining the power transmission factor LÜF is connected to a nonlinear filter NF which receives the power transmission factor lüf and generates a control variable $l_{pw}(k)$ by nonlinear smoothing. The control variable $l_{pw}(k)$ controls a level scales PW, which damps (attenuates) either the transmission branch or the reception branch. The filtered microphone signal $y_f(k)$ is generated by a second form filter FF2 from the microphone signal y(k). The short term average magnitude $\bar{e}_s(k)$ is generated from the filtered compensated transmitted signal $e_f(k)$ by a second estimation device SAM2.

Figure 3:
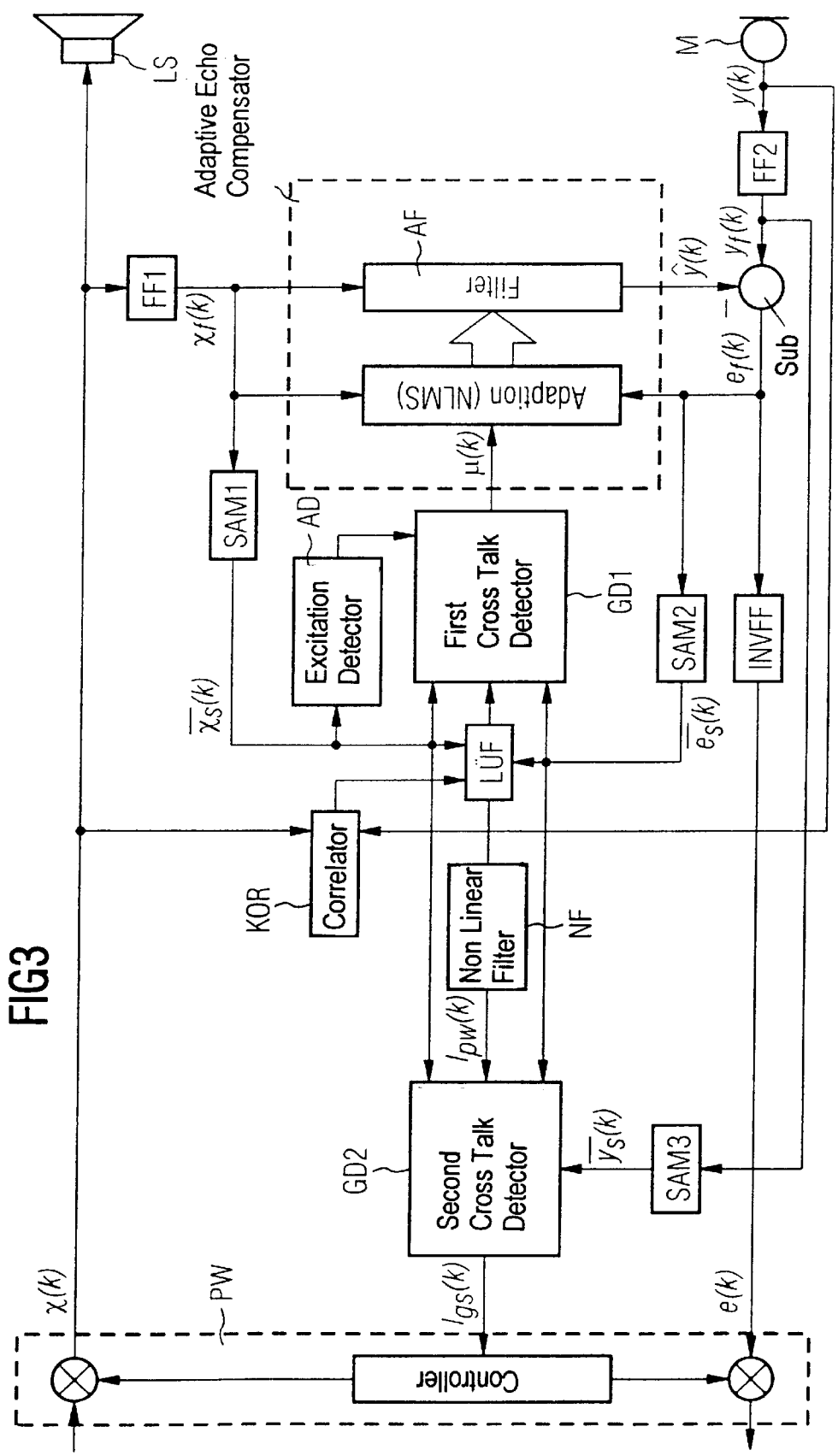
FIG. 3 is a circuit block diagram of a second embodiment for sidetone damping.

A second hands-free configuration is shown in FIG. 3 and receives the signal x(k) which is delivered to the speaker LS in the reception branch. A transmission branch is also provided which has the microphone M . The transmission branch signal e(k) is located at the output of the transmission branch and is transmitted, possibly damped, to the remote telephone set. The adaptive filter AF for sidetone damping is again provided, and is connected on the input side to the first form filter FF1 and the first estimating device SAM1 (for "short term average magnitude"). From the received signal x(k), the form filter FF1 generates a filtered received signal $x_f(k)$. From the filtered received signal $x_f(k)$, the adaptive filter AF generates the estimated microphone signa $\hat{y}(k)$ which is subtracted from the filtered microphone signal $y_f(k)$ in order to generate the compensated transmitted signal $e_f(k)$ The coefficients of the adaptive filter AF are adjusted by the use of the NLMS algorithm, in conjunction with the corresponding adaptation increment width $\mu(k)$ as already described above. The input variables of the NLMS algorithm are the filtered received signal $x_f(k)$, the adaptation increment width $\mu(k)$, and the filtered compensated transmitted signal $e_f(k)$. From the compensated transmitted signal $e_f(k)$, the transmitted signal e(k) is obtained by filtration using an inverse form filter INVFF. From the filtered received signal $x_f(k)$, a short term average magnitude $\bar{x}_s(k)$ is formed by the use of the first estimation device SAM1. The average magnitude $\bar{x}_s(k)$ is delivered first to the excitation detector AD, second to the first crosstalk detector GD1, third to the device for determining the power transmission factor LÜF, and fourth to a second crosstalk detector GD2. The second crosstalk detector GD2 is connected on its output side to the level scales PW. The first crosstalk detector GD1 also receives as input signals the output signal of the excitation detector AD, the power transmission factor lüf determined by the device for determining the power transmission factor LÜF, and the estimated short term average magnitude $\bar{e}_s(k)$ of the compensated transmitted signal $e_f(k)$. From these variables the first crosstalk detector GD1 determines the adaptation increment width $\mu(k)$ and makes the adaptation increment width $\mu(k)$ available to the adaptive echo compensator AK with the adaptive filter AF. The device for determining the power transmission factor LÜF has as its input signal the short term average magnitude $\bar{x}_s(k)$ of the received signal x(k), the correlation measurement which originates in the correlator KOR, and the short term average magnitude $\bar{e}_s(k)$ of the compensated transmitted signal $e_f(k)$. The correlator KOR determines the correlation measurement from the received signal x(k) and the microphone signal y(k). From the short term average magnitude $\bar{x}_s(k)$ of the received signal x(k), the control variable $l_{pw}(k)$ which is generated from the power transmission factor lüf by nonlinear smoothing using the nonlinear filter NF, the short term average magnitude $\bar{e}_s(k)$ of the compensated transmitted signal $e_f(k)$ and a short term average magnitude $\bar{y}_s(k)$ of the filtered microphone signal $y_f(k)$, the second crosstalk detector GD2 generates a control variable $l_{GS}(k)$ for controlling the level scales PW. The short term average magnitude $\bar{y}_s(k)$ is generated by using a third estimating device SAM3 which receives the filtered microphone signal $y_f(k)$. The filtered microphone signal $y_f(k)$ is generated by the use of the second form filter FF2 which receives the microphone signal y(k). The short term average magnitude $\bar{e}_s(k)$ is generated from the filtered compensated transmitted signal $e_f(k)$ by the second estimating device SAM2.

The form filters FF1, FF2 and INVFF decorrelate the corresponding input signals.

The power transmission factor lüf is not used for shifting a characteristic curve, as is described in the aforementioned prior art reference by P. Heitkämper, Freisprechen mit Verstärkungssteuerung und Echokompensation [Hands-Free Telephone with Gain Control and Echo Compensation], Fortschritt-Berichte, Reihe 10, Nr. 380 [Progress Reports, Series 10, No. 380], VDI [Association of German Engineers], Germany, 1995, but rather for echo compensation over the entire frequency band.

The estimating devices SAM1, SAM2 and SAM3 determine the power or average magnitudes of the various signals.

The first crosstalk detector GD1 checks whether there is crosstalk, and whether the excitation detector AD is furnishing an excitation signal. If there is no crosstalk and the excitation detector AD is furnishing the excitation signal, then the crosstalk detector GD1 sets the adaptation increment width $\mu(k)$ at a high level, or determines an optimal adaptation increment width $\mu_{opt}$ via the formula:

$$\mu_{opt} = \frac{\text{expected value }\{\varepsilon(k)\}}{\text{expected value }\{\varepsilon(k)\}} \quad \text{in which } \varepsilon(k) = \underline{g}^T \cdot \underline{x}(k)$$

$\varepsilon(k)$=echo component in the microphone signal y(k);
g=room pulse response, and $y(k) = \underline{g}^T \cdot \underline{x}(k) + n(k)$ Otherwise, $\mu(k)$ is set to a low value. The goal is to avoid divergence of the adaptive filter AF.

Only if the excitation detector AD detects sufficiently strong excitation and there is no crosstalk will the adaptation increment width $\mu(k)$ assume a high value.

The apparatuses shown in FIGS. 2 and 3 can be realized by using a signal processor.

The speeding up of the adaptation is achieved by using form filters (FF1, FF2, INVFF). The form filters are not structured adaptively, in order to avoid the higher expense for an additional filter branch. The increment width control for the NIMS algorithm will be described in further detail below.

In particular, the power transmission factor lüf is determined using a correlation measurement which is used in order to detect crosstalk. The apparatus of the invention will hereinafter be abbreviated COREC-F (for correlation controlled echo canceller-full band). In the COREC-F hands-free configuration a power transmission factor lüf between the received signal x(k) and the already compensated transmission branch signal e(k) is determined at suitable times to control the adaptation increment width $\mu(k)$. With the power transmission factor lüf, times in which crosstalk prevails can be determined reliably and the adaptation of the echo compensator can be stopped. The first crosstalk detector GD1 is thus substantially more sensitive when the adaptation filter has responded then when the compensator has not been calibrated, and stopping of the adaptation can be done faster in the event of crosstalk. With the echo compensator and the level scales of COREC-F, the ITU-T Recommendation on echo damping can be adhered to.

From the above-described power transmission factor lüf, nonlinear filtration produces a control variable $l_{pw}(k)$ with which the damping rise of the level scales PW can be reduced.

According to the ITU-T Recommendation G. 167, in the event of crosstalk it is permissible to reduce the damping rise by 15 dB. The COREC-F hands-free configuration includes the second detection unit GD2, with which reliable times for reducing the damping rise can be detected and imparted to the level scales PW by way of the aforementioned control variable. The maximum possible echo damping with the adaptive echo compensator AK is determined, among other factors, also by the number of filter coefficients used.

A way has been found to increase the number of filter coefficients by a variable factor, while the computation effort remains constant. An attendant reduction of the convergence speed is not problematic in a practical application, given correct dimensioning, and can be tolerated satisfactorily.

The adaptation of the adaptive echo compensator AK should be performed only if sufficient excitation on the part of the remote subscriber equipment is present. Whether sufficient excitation is present is ascertained by the excitation detector AD, in which the short term average magnitude of the received signal $\bar{x}_s(k)$ is compared with an adaptive received signal threshold value $x_0(k)$ using equation (1).

$$\bar{x}_s(k+1) = \begin{cases} \alpha_f \bar{x}_s(k) + (1-\alpha_f)|x(k)| & \text{for } |x(k)| < \bar{x}_s(k) \\ \alpha_r \bar{x}_s(k) + (1-\alpha_r)|x(k)| & \text{for } |x(k)| \geq \bar{x}_s(k) \end{cases} \quad (1)$$

$$0 < \alpha_r < \alpha_f < 1$$

If $\bar{x}_s(k) < x_0(k)$, then the adaptation is stopped on the grounds of sufficient excitation. If the short term average magnitude $\bar{x}_s(k)$ is even less, by a factor of $p_{bg}$ than the adaptive received signal threshold value $x_0(k)$, then this latter threshold value is updated; otherwise, it remains unchanged:

$$x_0(k+1) = \begin{cases} \alpha_1 x_0(k) + (1-\alpha_1)|x(k)| & \text{for } \bar{x}_s(k) < p_{bg} \cdot x_0(k) \\ x_0(k) & \text{if not} \end{cases} \quad (2)$$

$$0 < \alpha_1 < 1$$

The factors $\alpha_f$ and $\alpha_r$ are selected such that the short term average magnitude $\bar{x}_s(k)$ of the received signal x(k) follows rising magnitudes of $x_0(k)$ faster than decreasing magnitudes. With the constant $\alpha_1$ a substantially greater time constant is established.

If adequate excitation is present (the excitation detector AD furnishes an excitation signal accordingly), then the attempt is made, using the first crosstalk detector GD1, to ascertain whether crosstalk is happening at the moment. To that end, the power transmission factor lüf(k) is calculated from the received signal x(k) and the compensated transmitted signal $e_f(k)$. The compensated transmitted signal $e_f(k)$ is calculated from the difference between the filtered microphone signal $y_f(k)$ and the microphone signal $\hat{y}(k)$ estimated using the adaptive filter AF. The smoothed power transmission factor lüf is always calculated whenever a correlation measurement p(k) is greater than a threshold value $p_0$ by equation (3).

$$l\ddot{u}f(k+1) = \begin{cases} \alpha_{l\ddot{u}f} l\ddot{u}f(k) + (1-\alpha_{l\ddot{u}f}) \cdot \frac{\bar{x}_s(k)}{\bar{e}_s(k)} & \text{for } p(k) > p_0 \\ l\ddot{u}f(k) & \text{if not} \end{cases} \quad (3)$$

$$0 < \alpha_{l\ddot{u}f} < 1$$

The quotient of the power transmission factor lüf and the short term average magnitude $\bar{x}_s(k)$ thus produce an estimated value for the short term average magnitude $\bar{e}_s(k)$ of the residual echo to be expected. If the average magnitude $\bar{e}_s(k)$ of the actual residual echo present is greater than the estimated echo multiplied by a constant $p_{ugs}$ (ugs stands for uncertain crosstalk), then it can be assumed that a local conversation partner is talking at the time. With the constant $p_{ugs}$, the sensitivity of crosstalk detection can be adjusted.

The adaptation increment width $\mu(k)$ is then selected as follows:

$$\mu(k) = \begin{cases} \mu_0 & \text{if } \bar{x}_s(k) > x_0(k) \text{ and if } \bar{e}_s(k) < p_{ugs}\dfrac{\bar{x}_s(k)}{l\ddot{u}f} \\ 0 & \text{if not} \end{cases} \quad (4)$$

The above-described power transmission factor lüf is a measure of the damping that the speech signal of the remote person speaking undergoes. To control the pw, however, a suitable control variable $l_{pw}$ can be derived from the power transmission factor lüf by nonlinear filtration as shown in equation (5):

$$l_{p\omega}(k) = \begin{cases} \beta_f l_{p\omega}(k-1) + (1-\beta_f) l\ddot{u}f(k) & \text{for } l\ddot{u}f(k) < l_{p\omega}(k) \\ \beta_r l_{p\omega}(k-1) + (1-\beta_r) l\ddot{u}f(k) & \text{for } l\ddot{u}f(k) \geq l_{p\omega}(k) \end{cases} \quad (5)$$

$$0 < \beta_r < \beta_f < 1$$

In the previous paragraphs, a method for interrupting the adaptation of the echo compensator AK during crosstalk has been described. The adaptation is discontinued if there is a suspicion of crosstalk.

Advantageously, the damping of the damping device PW can be reduced if crosstalk is detected. This increases the quality of the transmission when crosstalk is taking place.

The damping rise should not be reduced until whenever the suspicion of crosstalk has been confirmed. To ascertain moments where crosstalk is certain, two criteria must be simultaneously met. To meet the first criteria, the short term average magnitude $\bar{e}_s(k)$ must be greater by a constant $p_{sgs}$ (sgs stands for certain crosstalk) than the value which was sufficient for stopping the adaptation (see equation 4). The second criteria is that the magnitude of the difference between $\bar{y}_s(k)$ and $\bar{e}_s(k)$, which magnitude is standardized to the short term average magnitude $\bar{y}_s(k)$, must be greater than a factor $p_{gs}$.

If both criteria are met, then the increase in the control variable $l_{add}$ is calculated as follows:

$$l_{add}(k) = \qquad (6)$$

$$\begin{cases} \beta_a l_{add}(k-1) + (1-\beta_a) \cdot 15\,\text{dB} & \text{if } \bar{e}_s(k) < p_{sgs} \cdot p_{ugs}\dfrac{\bar{x}_s(k)}{l\ddot{u}f} \\ & \text{and } \dfrac{\bar{y}_s(k) - \bar{e}_s(k)}{\bar{y}_s(k)} > p_{gs} \\ \beta_b l_{add}(k) & \text{if not} \end{cases}$$

where $0 < \beta_a < \beta_b < 1$.

The constants $\beta_a$ and $\beta_b$ are dimensioned such that greater inertia pertains than with the nonlinear filter in equation 5. The resultant control variable $l_{gs}(k)$ can then be calculated as:

$$l_{gs}(k) = l_{pw}(k) + l_{add}(k) \qquad (7)$$

In order for a given computer effort to increase the number N of possible filter coefficients, the adaptation of the filter coefficients can be distributed over a plurality of sampling steps (let $N_u$ be an integral divisor of N). The filtering, conversely, continues to be performed for each sampling step.

As a result it is attained that each filter coefficient undergoes a renewal only every $N_u^{th}$ step.

Let $\underline{c}k$ stand for the total filter vector and $\underline{x}k$ stand for the vector of the input signal, where $$\underline{c}(k) = \begin{pmatrix} c_0(k) \\ \vdots \\ c_{N-1}(k) \end{pmatrix} \qquad \underline{x}(k) = \begin{pmatrix} x(k) \\ \vdots \\ x(k-N+1) \end{pmatrix} \qquad (8)$$

The vectors of the coefficients and the input data can be distributed over vectors that succeed one another (see equation 9) or vectors that are meshed with one another (see equation 10). The same is also true for $\underline{x}(k)$.

$$\underline{c}_1(k) = \begin{pmatrix} c_0(k) \\ \vdots \\ c_{\frac{N}{N_u}-1}(k) \end{pmatrix}, \quad \underline{c}_2(k) = \begin{pmatrix} c_{\frac{N}{N_u}}(k) \\ \vdots \\ c_{2\frac{N}{N_u}-1}(k) \end{pmatrix}, \quad \ldots \qquad (9)$$

$$\underline{c}_{N_u}(k) = \begin{pmatrix} c_{N-N_u}(k) \\ \vdots \\ c_{N-1}(k) \end{pmatrix}$$

$$\underline{c}_1(k) = \begin{pmatrix} c_0(k) \\ c_{N_u} \\ \vdots \\ c_{N-N_u}(k) \end{pmatrix}, \quad \underline{c}_2(k) = \begin{pmatrix} c_1(k) \\ c_{N_u+1}(k) \\ \vdots \\ c_{N-N_u+1}(k) \end{pmatrix}, \quad \ldots \qquad (10)$$

$$\underline{c}_{N_u}(k) = \begin{pmatrix} c_{N_u-1}(k) \\ c_{2N_u-1}(k) \\ \vdots \\ c_{N-1}(k) \end{pmatrix}$$

The otherwise usual equations for every time point k for filtration:

$$\hat{y}(k) = \underline{c}^T(k) \cdot \underline{x}(k) \qquad (11)$$

and adaptation:

$$\underline{c}(k+1) = \underline{c}(k) + \mu(k)\dfrac{y(k) - \hat{y}(k)}{\underline{x}^T(k)\underline{x}(k)}\underline{x}(k) \qquad (12)$$

are thus distributed, for the adaptation portion, among $N_u$ equations for successive times:

Time $k$: $\quad \underline{c}_1(k) = \underline{c}_1(k) + \mu(k)\dfrac{y(k) - \hat{y}(k)}{\underline{x}^T(k)\underline{x}(k)}\underline{x}_1(k)$ Time $k+1$: $\quad \underline{c}_2(k) = \underline{c}_2(k) + \mu(k)\dfrac{y(k) - \hat{y}(k)}{\underline{x}^T(k)\underline{x}(k)}\underline{x}_2(k)$ $\vdots \qquad \qquad \vdots$ Time $k+N_u-1$: $\quad \underline{c}_{Nu}(k) = \underline{c}_{Nu}(k) + \mu(k)\dfrac{y(k) - \hat{y}(k)}{\underline{x}^T(k)\underline{x}(k)}\underline{x}_{Nu}(k)$ Since, in the signal processor, the effort of a convolution integral is proportional to the filter length N, and the effort of the adaptation operation is proportional to 4N, the length ening of the filter by the factor $N_1/N$ can be achieved if $N_u$ is selected within a suitable range (see FIG. 3):

$$\frac{N_1}{N} = \frac{5}{1 + \frac{4}{N_u}} \quad (13)$$

in which:

5=expenditure for NLMS and filtration
4=expenditure for NLMS

For implementation, it appears appropriate to select $N_u$ in a range from 2 to 8.

Figure 4:
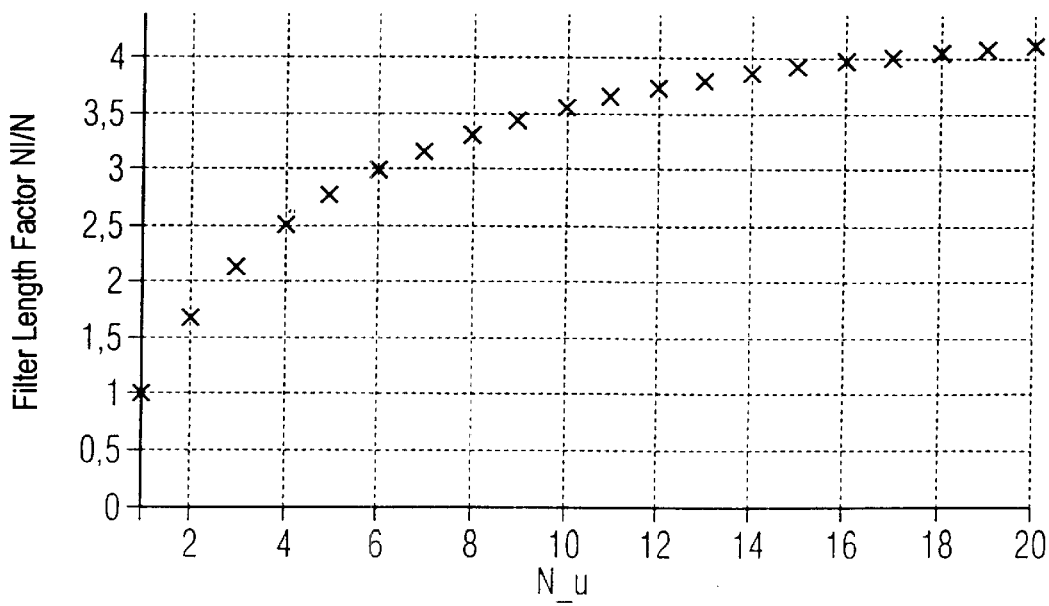
FIG. 4 is a graph showing an increase in filter length being achieved by an internested calibration.

In FIG. 4, $N_u$ is plotted from 0 to 20 on the abscissa, and the filter length factor $N_1/N$ is plotted from 0 to 4.5 on the ordinate.

In numerical terms, the expenditure for the present implementation is approximately 4 for the NLMS algorithm and approximately 5 for the NLMS algorithm and filtration. If a different signal processor is used, then the numbers may be different.

I claim:

1. An apparatus for acoustical sidetone damping, comprising:

a reception branch having a speaker and receiving an input signal;

a transmission branch having a microphone for transmitting an output signal;

an adaptive echo compensator for compensating for an echo in said transmission branch, said adaptive echo compensator adaptively filtering the input signal of said reception branch for producing a filtered signal, and subtracting the filtered signal from the output signal of said transmission branch resulting in a compensated output signal;

a damping device for damping at least one of the compensated output signal of said transmission branch and the input signal of said reception branch;

a correlator for determining and outputting a correlation measurement signal, the correlation measurement signal derived from the input signal of said reception branch and the output signal of said transmission branch;

a control device connected to said adaptive echo compensator and to said damping device, said control device outputting control signals for adaptation of said adaptive echo compensator and for adjusting damping of said damping device, said control device receiving an average signal magnitude of the input signal and an average signal magnitude of the compensated output signal, said control device receiving the correlation measurement signal; and an excitation detector for receiving the average signal magnitude of the input signal, comparing the average signal magnitude to a predetermined average magnitude, and outputting an excitation signal if an adequate average signal magnitude of the input signal is present.

2. The apparatus according to claim 1, wherein said control device outputs a corresponding signal if said correlator ascertains crosstalk in said transmission branch and in said reception branch, said echo compensator receiving the corresponding signal and the adaptation of said echo compensator is halted if the corresponding signal is received.

3. The apparatus according to claim 1, wherein said echo compensator receives the excitation signal and the adaptation of said echo compensator occurs only if said excitation detector is outputting the excitation signal.

4. The apparatus according to claim 1, including a first crosstalk detector for receiving and processing the excitation signal from said excitation detector and the control signals from said control device, said first crosstalk detector furnishing a corresponding first crosstalk signal to said echo compensator.

5. The apparatus according to claim 4, including a second crosstalk detector outputting a corresponding control signal received by and controlling said damping device, said second crosstalk detector receiving the average signal magnitude of the input signal, an average signal magnitude of the output signal, the average signal magnitude of the compensated output signal, and a control signal from the control device.

6. The apparatus according to claim 5, wherein said second crosstalk detector reduces the damping of said damping device if crosstalk is detected in said transmission branch and in said reception branch.

7. The apparatus according to claim 1, wherein said echo compensator has filter coefficients and the adaptation of said filter coefficients is distributed over a plurality of sampling steps for increasing a number of said filter coefficients of said echo compensator.

8. The apparatus according to claim 1, wherein the adaptation of said echo compensator is effected by means of a normalized least mean square method.

9. An apparatus for acoustical sidetone damping, comprising:

a reception branch having a speaker and receiving an input signal;

a transmission branch having a microphone for transmitting an output signal;

an adaptive echo compensator for compensating for an echo in said transmission branch, said adaptive echo compensator adaptively filtering the input signal of said reception branch for producing a filtered signal, and subtracting the filtered signal from the output signal of said transmission branch resulting in a compensated output signal;

a damping device for damping at least one of the compensated output signal of said transmission branch and the input signal of said reception branch;

a correlator for determining and outputting a correlation measurement signal, the correlation measurement signal derived from the input signal of said reception branch and the output signal of said transmission branch;

a control device connected to said adaptive echo compensator and to said damping device, said control device outputting control signals for adaptation of said adaptive echo compensator and for adjusting damping of said damping device, said control device receiving an average signal magnitude of the input signal and an average signal magnitude of the compensated output signal, said control device receiving the correlation measurement signal; and a first form filter for outputting a first filter signal connected between said reception branch and said adaptive echo compensator, a second form filter for outputting a second filter signal connected downstream of said microphone in said transmission branch, and an inverse form filter connected downstream of said second form filter in said transmission branch.

10. The apparatus according to claim 9, including:
a first estimating device for deriving the average signal magnitude of the input signal, said first estimating device connected between said first form filter and said control device, said first estimating device receiving the first filter signal and estimating an average magnitude of the first filter signal for deriving the average signal magnitude of the input signal, and outputting the average signal magnitude of the input signal to said control device; and a second estimating device connected upstream of said control device for deriving the average signal magnitude of the compensated output signal, said second estimating device receiving the second filter signal and estimating an average magnitude of the second filter signal for deriving the average signal magnitude of the compensated output signal, and outputting the average signal magnitude of the compensated output signal to said control device.

* * * * *